Oct. 9, 1934.  C. I. McNEIL  1,976,289
VOLTAGE REGULATOR
Original Filed June 9, 1930

Inventor
Charles I. McNeil.

By F. B. Smith
Attorney

Patented Oct. 9, 1934

1,976,289

UNITED STATES PATENT OFFICE 1,976,289

VOLTAGE REGULATOR

Charles I. McNeil, Bloomfield, N. J., assignor to Eclipse Aviation Corporation, East Orange, N. J., a corporation of New Jersey Application June 9, 1930, Serial No. 460,016
Renewed September 8, 1933

11 Claims. (Cl. 171—312)

This invention relates to electrical apparatus and more particularly to voltage regulation of a multi-current generator.

One of the objects of this invention is to provide a novel method of controlling the high voltage output of a multi-current generator.

Another object is to provide in a double-wound armature generator, a novel means for maintaining the voltage output of one winding substantially constant by controlling the voltage output of the other armature winding.

Another object is to provide a self-energized double-wound armature generator in which variations in the voltage output of the two armature windings are proportional and to further provide a novel means for controlling the voltage output of both windings.

Another object is to provide a self-energized double-wound armature generator adapted to be attached to the crank shaft of an airplane engine, and to further provide a novel means for maintaining the high voltage output substantially constant irrespective of changes in the speed of the airplane engine.

Another object is to provide a self-energized high voltage generator having a source of low voltage current for energizing its field to insure proper functioning of the contacts of a regulating device and to prevent quick deterioration of the contacts due to pitting and burning which occurs when high voltage current is used.

The above and other objects will appear more fully hereafter in the detailed description of the invention which may be embodied in a number of electro-mechanical forms. It is to be expressly understood, however, that the drawings are for the purpose of illustration only and are not designed as a definition of the limits of the invention, reference being had for this purpose to the appended claims.

Figure 1:
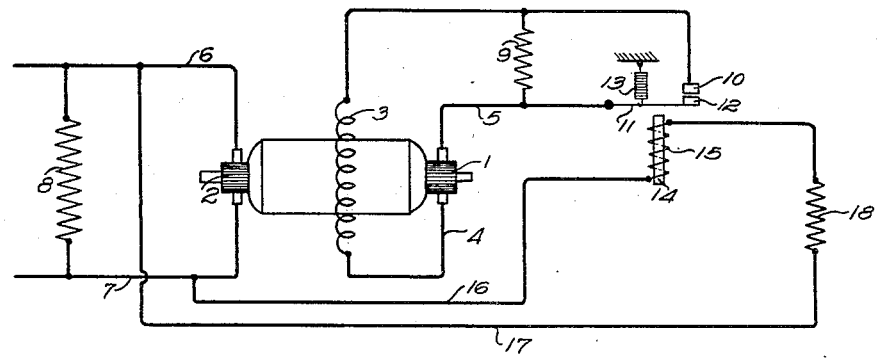
Figure 2:
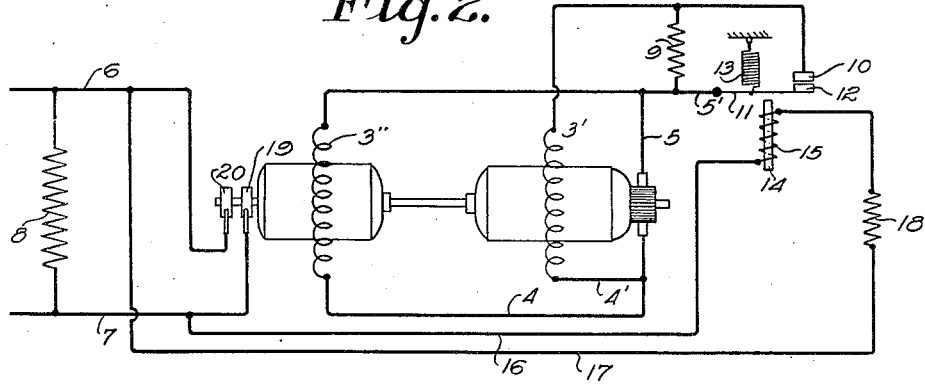
Figure 3:
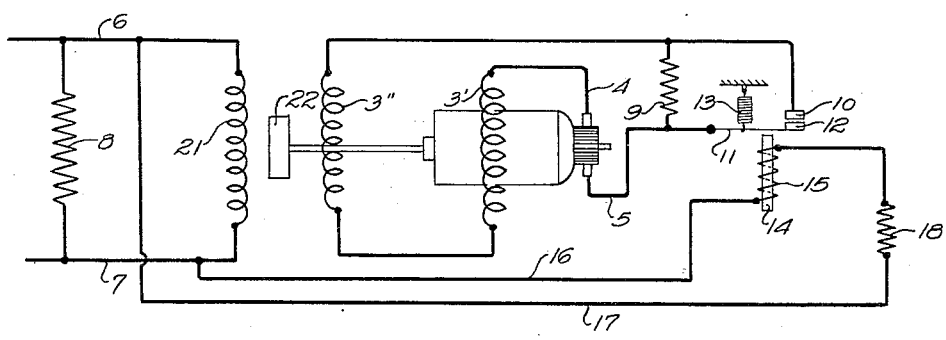

Referring to the drawing, wherein like reference characters refer to like parts throughout the several views, Fig. 1 is a diagrammatical view of a dynamo-electric machine and its associated circuits embodying the invention and in which a double-wound armature is adapted to produce direct current at either end;

Fig. 2 is a diagrammatical view illustrating the present invention as applied to a multi-current generator producing high voltage alternating current at one end and low voltage direct current at the other end; and Fig. 3 is a diagrammatical view illustrating the invention as applied to a multi-current generator producing low voltage direct current at one end and high voltage alternating current at the other end, by an inductor type alternator rotor.

In the form shown in Fig. 1, the invention embodies a double-wound armature generator of the direct current type. Preferably, the generator is a four-pole machine having an armature drum carrying two separate windings and a commutator at each end thereof, the windings being such that a high voltage is delivered by one commutator and a low voltage by the other. The low voltage armature winding and commutator are diagrammatically indicated at 1 and the corresponding parts of the high voltage winding at 2. A shunt field winding 3 is employed that is common to both armature windings and energized from the low voltage commutator 1 by leads 4 and 5. The high voltage commutator is adapted to supply current to a variable load circuit represented by leads 6 and 7 and a consuming resistance 8. The armature shaft on which the drum and windings are mounted is adapted to be driven by any suitable source of power such as an internal combustion engine.

The method of controlling the high voltage output of the machine consists of first, intermittently placing a resistance in series with the field to vary the field strength, and secondly, of controlling the period of the intermittent action, or in other words, to control the length of time during which the resistance is in series with the field, by and in accordance with variations in the high voltage output.

The apparatus and circuit employed for carrying out this method comprises a resistance 9 connected at one end to the field winding and at the other end to the lead 5, constituting a series circuit. A circuit breaker is shunted around the resistance 9 and comprises a stationary contact 10 connected on one side of the resistance, and a magnetically influenced contact arm 11 connected on the other side of the resistance and carrying a cooperating contact 12. This pivoted contact arm 11 is resiliently held in a normally closed position by means of a spring member 13.

It will be readily observed that when the circuit breaker is in its normally closed position the current output of the low voltage armature will flow through lead 5, contact arm 11, contacts 12 and 10, field winding 3, and lead 4, to the commutator and armature winding 1. The resistance to the current in the field circuit when the normal closed condition of the circuit breaker is maintained will be the resistance of the field winding only which permits a predetermined current flow and field strength for a given voltage. However, when the circuit breaker is opened, the current output of the low voltage armature completes the circuit from the lead 5, through the resistance 9, field winding 3, and lead 4 back to the commutator and armature field winding 1. In this position of the circuit breaker the resistance of the field circuit is the resistance of the field winding plus the resistance 9 which will permit the same predetermined current flow and field strength only when the low voltage output has increased a predetermined amount above normal. The magnetically influenced contact arm 11 is adapted to intermittently open and close and increase and decrease the field circuit resistance and current flow for varying the voltage output of the machine.

In the second step of the method which consists of controlling the period or intermittent action, of inserting the resistance in the field circuit, a varying electromagnetic field is placed in operative relation with the magnetically influenced pivoted contact arm 11 on the opposite side from the spring means 13. This auxiliary magnetic field comprises a soft iron core 14 having a magnet winding 15. This winding is connected by means of leads 16 and 17 across the high voltage output leads 6 and 7. A regulating resistance 18 is placed in one of the leads 16 or 17 in series with the magnet winding 15 to decrease the current flow or load of this winding. When the strength of this magnetic field upon the contact arm 11 is sufficient to overcome the tension of the spring 13, contact arm 11 will move rapidly to open the armature field circuit and the resistance 9 is inserted in the field circuit.

Coil 15 and resistance 18 are so designed that when the high voltage output increases a very small amount above a given normal, the strength of the magnetic field of coil 15 will be sufficient to move the contact arm 11 to open position and conversely when the high voltage output decreases a very small amount below its given normal, spring 14 will again close the contact. The difference above and below normal of the voltage output which will influence the contact arm 11 is so small that it may be considered for all practical purposes constant. As the rotational speed of the armature windings increases with a constant field, the voltage output of the machine will increase in direct proportion. Therefore, to maintain the voltage output constant, the main field strength must be varied and the effective strength will be dependent upon its effective resistance or the period or length of time in which the resistance 9 is in the main field circuit.

When the high voltage output is constant and substantially normal there will be no change produced in the main field circuit, but when the high voltage output increases the magnetic field of coil 15 will increase and will open the shunt circuit breaker arm 11, and resistance 9 will be inserted into the armature field circuit which will weaken the field strength and decrease both the high and low voltage armature output. The effective auxiliary field strength will then be decreased by the decrease in the high voltage output and spring 14 will again close the contact. It will also be readily observed that when there is a decided tendency for the high voltage output to increase, such as an increase in speed of the armature shaft, the action of the magnet coil 15, circuit breaker, and resistance will be more rapid, and the effect will be an intermittent placing of the resistance in circuit with the field, and the greater the period of such intermittent action the greater will be the duration of time in which the resistance 9 is in circuit with the field winding and a greater effective resistance and less effective current flow. As the effect of an increase or decrease in field current instantaneously affects the armature output, the result will be a substantially constant voltage output in each of the armature windings.

The respective high and low voltage outputs referred to throughout this specification are considered essential to the practical application of the present invention. Although theoretically high voltage may be used to energize the armature field, actually the effect on the contacts of the circuit breaker is a rapid deterioration. Also, there is a tendency for the contacts to stick together which renders the regulator useless. For this reason the low voltage armature winding is used to create a source of low voltage current to energize the field.

The apparatus constituting this invention is particularly adapted for use in airplanes directly connected to the crank shaft. Under these conditions there is no other available source of current with which to energize the main field and so the machine must be of the self-energized type. Because of variations in speed over a wide range to which the machine will be subjected it is essential that the voltage output be effectively controlled over this wide range. It has been found that the voltage regulator thus far described accomplishes this result to a high degree.

Fig. 2 shows another type of generator to which the present invention is applied. In this modification, a multi-current double-wound armature generator is used in which the low voltage direct current is taken from the commutator 1 at one end and the high voltage alternating current is taken from split rings 19 and 20 at the other end. A variable load circuit is connected across the split rings, as indicated by the leads 6 and 7 and consuming resistance 8. The main shunt field circuit is connected across the commutator 1 of the low voltage armature winding. In this modification there are separate fields 3' and 3" for the two armature windings which are in parallel, and regulation of the high voltage alternating current output is controlled by varying the low voltage armature field 3' only. In this low voltage branch field circuit 3', the resistance 9 is placed in series with one of the leads 5', and the circuit breaker having contacts 10 and 11 is shunted around the resistance. The magnet coil 15 and regulating resistance 18 are connected across the high voltage output leads 6, 7 by means of leads 16, 17 as disclosed in Fig. 1. The magnet coil 15 is placed in operative relation with the magnetically influenced contact arm 11 as clearly shown. The controlling of the high voltage output is effected in the same way as in the first modification, except that the resistance 9 has no direct effect upon the high voltage main field 3'. In this case, as the low voltage main field strength is affected, the low voltage output is affected which in turn varies the high voltage field winding 3" and controls directly the high voltage output. By this means the high voltage output is controlled by intermittently varying the low voltage field strength by and in accordance with variations in the high voltage output.

Fig. 3 shows still another type of generator to which the present invention may be applied. In this modification, a multi-current generator is used in which the low voltage direct current is taken from a commutator at one end and the high voltage alternating current is taken from the inductor winding 21. In this modification, as in the one disclosed in Fig. 2 there are separate fields for the two armature windings. Instead of being in parallel they are connected in series and regulation of the high voltage alternating current output is controlled by the field strength for both armatures the same as in the modification disclosed in Fig. 1. The alternator used in this form is of the inductor type where the field winding 3″ and the induction load winding 21 are stationary, and an iron core 22 is rotated for varying the magnetic reluctance. This variation in reluctance causes an induced alternating current in the load winding 21 which supplies a variable load circuit as indicated by leads 6, 7 and consuming resistance 8. The field varying means comprising the resistance 9 and the shunt circuit breaker 10, 12 is put in series with the field windings 3 and 3′. The magnet coil 15 and regulating resistance 18 are connected across the high voltage output leads 6, 7. The magnet coil 15 is placed in operative relation with the magnetically influenced pivoted arm 11, as clearly shown. By this means, as in the modification shown in Fig. 1, the high voltage output is controlled by intermittently varying the low voltage field strength by and in accordance with variations in the high voltage output.

Various changes may be made in the electromechanical features of the invention. For example, it may be desirable to provide indicating instruments such as voltmeters and meters for various purposes. Suitable switches may be employed where desirable, and various other changes, modifications, substitutions, additions and omissions may be made without departing from the spirit and scope of the appended claims.

What is claimed is:

1. A method of controlling the high voltage output of a double-wound armature generator having a resistance associated with a common field which is energized by the low voltage output, which consists in intermittently placing said resistance in circuit with said field, and controlling the period of said intermittent action by the variations of the high voltage output.

2. A method of controlling the high voltage output of a double-wound armature generator having a resistance associated with its field and said field being energized by a varying source of power, which consists in intermittently placing said resistance in circuit with said field, and controlling said intermittent action by the varying flux of a magnetic field produced by the high voltage output.

3. In combination with a multi-current generator having a plurality of armature windings, a high voltage variable load circuit connected to one winding, a low voltage field circuit connected to another winding, means in the low voltage circuit for varying the field strength, and means in the high voltage circuit operatively associated with the first named means for controlling the field strength by and in accordance with the voltage in the variable load circuit.

4. In combination with a multi-current generator having a plurality of armature windings, a high voltage variable load circuit connected to one winding, a low voltage field circuit connected to another winding, means comprising a resistance and circuit breaker in the low voltage circuit for varying the field strength, and electro-magnetic means in the high voltage circuit operatively associated with the first named means for controlling the field strength by and in accordance with the voltage in the variable load circuit.

5. In combination with a multi-current generator having a plurality of armature windings, a high voltage variable load circuit connected to one winding, a low voltage field circuit connected to another winding, a resistance in the field circuit, a circuit breaker in the field circuit for shunting the resistance, and electromagnetic means energized by the variable load circuit operatively associated with the circuit breaker for intermittently placing the resistance in the field circuit by and in accordance with the voltage strength in the variable load circuit.

6. In a multi-current generator, a high voltage variable load circuit, a low voltage field circuit, a main armature winding for energizing the high voltage variable load circuit, an auxiliary winding for energizing the field circuit, means in said field circuit for varying the field strength, and a second means in said high voltage circuit in operative relation with the first named means, whereby the field strength is varied by and in accordance with variations in the high voltage output.

7. In a multi-current generator having a shaft adapted to be driven at variable speeds by a variable power source, a high voltage variable load circuit, a low voltage field circuit, a main armature winding on said shaft for energizing the high voltage variable load circuit, an auxiliary armature winding for energizing the field circuit, the latter being common to both armatures, a means in said field circuit for intermittently varying the field strength, and a second means in the high voltage circuit in operative relation with the first named means for controlling the period of intermittent action of the first named means by the voltage variations in the high voltage circuit, whereby the high voltage output is maintained substantially constant irrespective of the speed of the generator shaft.

8. A constant potential generating system comprising a dynamo electric machine having two independent output circuits, one of which constitutes a field circuit of the machine, and means in one of the output circuits and controlled by the other output circuit for controlling the field excitation of said dynamo electric machine to maintain the output voltages substantially constant.

9. A constant potential generating system comprising an electric current generator having two independent output circuits, one of which constitutes a field circuit of the generator, means in said field circuit for controlling the field current, and means associated with the other output circuit for controlling the first named means to maintain the output voltages substantially constant.

10. A constant potential generator having independent high and low voltage output circuits, one of which constitutes the field circuit of said generator, and means in the low voltage output circuit controlled by the high voltage output circuit for varying the field current of said generator to maintain the output voltages substantially constant.

11. A constant potential generator having independent high and low voltage output circuits, said low voltage circuit constituting the field circuit of the generator, means in said field circuit for controlling the field current, and means associated with the high voltage output circuit for controlling the said field current in accordance with the voltage of said high voltage output circuit to maintain the output voltages substantially constant.

CHARLES I. McNEIL.